July 19, 1960   L. L. ALMETER   2,945,275
SAFETY BELT SYSTEM CONSTRUCTION
Filed Sept. 27, 1956   3 Sheets-Sheet 1
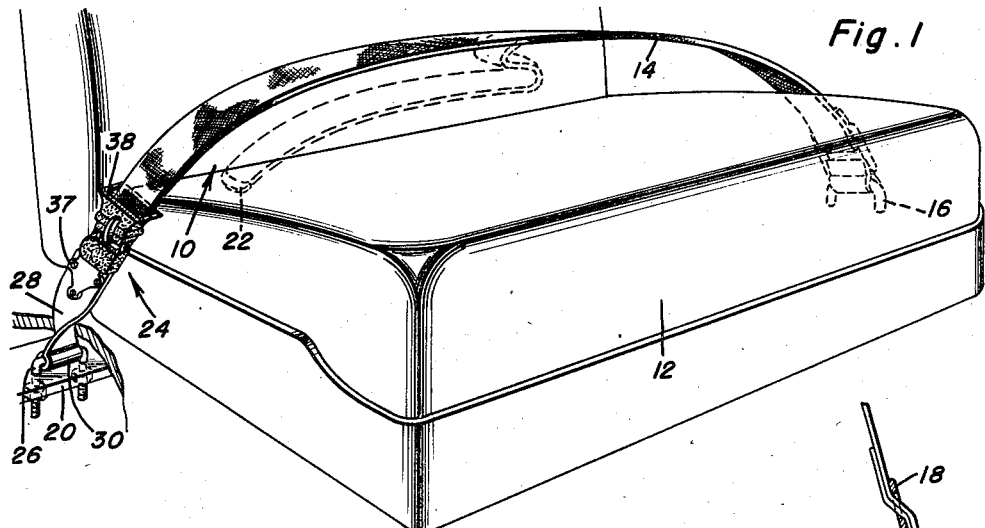
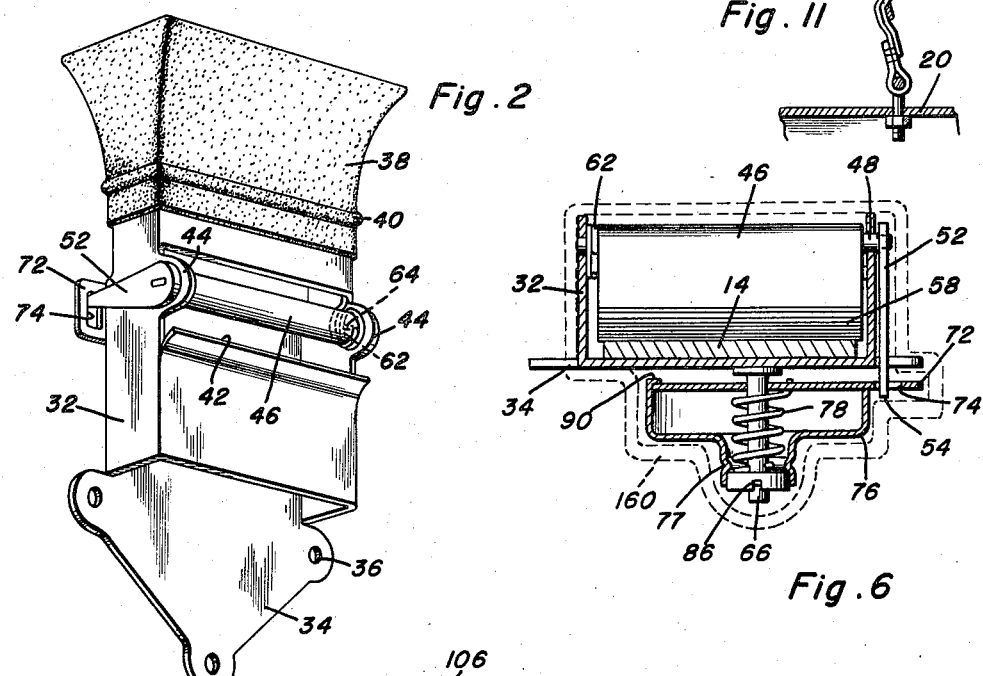
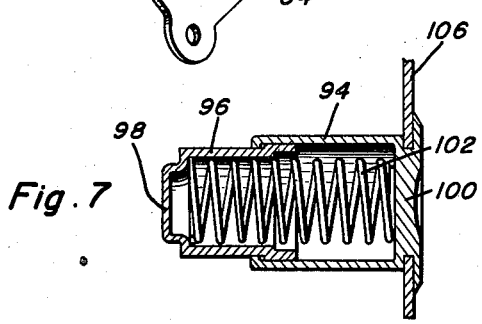
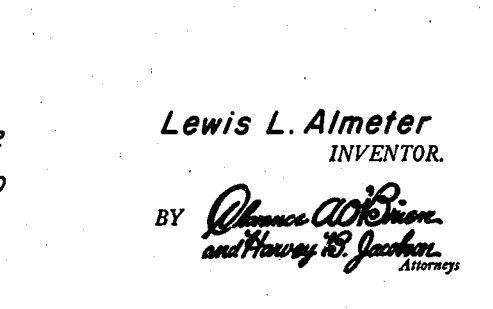
Lewis L. Almeter
INVENTOR.

July 19, 1960 L. L. ALMETER 2,945,275
SAFETY BELT SYSTEM CONSTRUCTION
Filed Sept. 27, 1956 3 Sheets-Sheet 2

Lewis L. Almeter
INVENTOR.

BY *Clarence A. O'Brien*
*and Harvey B. Jackson*
Attorneys

July 19, 1960     L. L. ALMETER     2,945,275
SAFETY BELT SYSTEM CONSTRUCTION
Filed Sept. 27, 1956     3 Sheets-Sheet 3
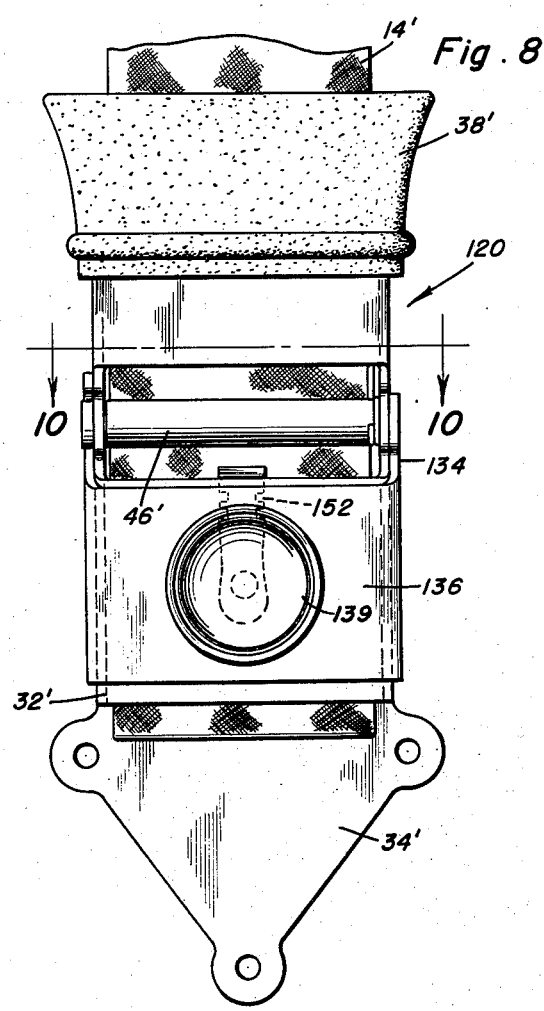
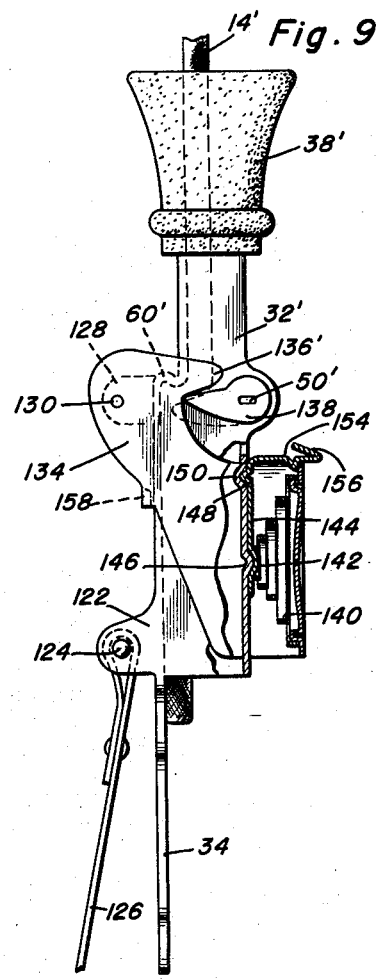
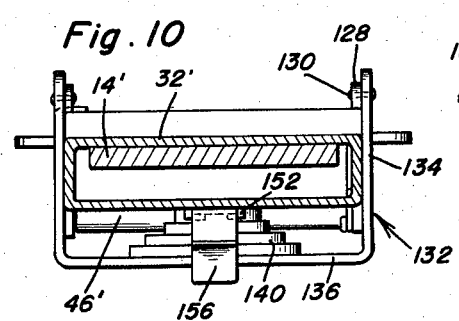
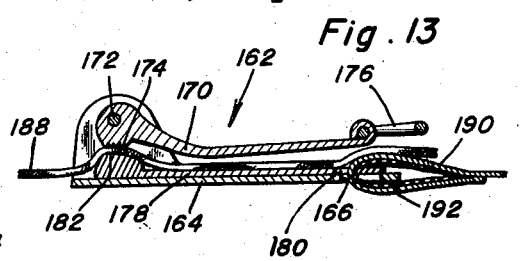
Lewis L. Almeter
INVENTOR.
BY

United States Patent Office 2,945,275
Patented July 19, 1960

2,945,275

SAFETY BELT SYSTEM CONSTRUCTION

Lewis L. Almeter, La Crescent, Minn. (% La Crosse Metal Products Company, 1800 Rose St., La Crosse, Wis.)

Filed Sept. 27, 1956, Ser. No. 612,445

10 Claims. (Cl. 24—170)

This invention generally relates to a safety device and more particularly to a safety belt system which has particular adaptation for installation in various types of pleasure and commercial vehicles, amusement devices, aircraft of military, commercial and pleasure types and any other places where safety of persons is imperiled thereby necessitating restraining means as may be offered by safety belts.

While the safety belt system of the present invention is to be specifically described in connection with automotive vehicles or similar type vehicles, it is to be understood that the safety belt system may be one wherever persons in specialized services require the same, such as linemen, window washers, firemen, policemen, bridge or other girder erectors, and other persons in similar industrial endeavors.

There have been some developments in the field of safety belts but these devices have not become popular for several reasons. The safety belts are inconvenient and it is sometimes difficult to locate the loose ends of belts in order to form a buckled connection. A certain amount of dexterity is required in making the buckled connection thus rendering such connection hard to make by certain classes of individuals. Also, a certain degree of strength is required and it is extremely difficult to make the buckled connection in the dark and the time involved and the over-all inconvenience has rendered the safety belts relatively unpopular. Accordingly, it is the primary object of the present invention to provide a safety belt construction which reduces the manual operations of making a belt connection to the lowest possible minimum of movement of fingers or hands and also to lessen the energy required and to eliminate any need for dexterity.

Other objects of the present invention will reside in its simplicity of construction, ease of assembly, adaptation for various purposes and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view illustrating the safety belt construction of the present invention installed on a vehicle seat;

Figure 2 is a perspective view of the safety belt anchor;

Figure 6 is a transverse, plan sectional view taken substantially upon a plane passing along section line 6—6 of Figure 3 illustrating the relationship of the cam lock and belt;

Figure 7 is a detailed sectional view taken substantially upon a plane passing along section line 7—7 of Figure 4 illustrating further details of construction of the invention;

Figure 8 is a front view of a modified form of the present invention;

Figure 9 is a side elevational view of the modified form of the invention with portions thereof being broken away;

Figure 10 is a plan sectional view taken substantially upon a plane passing along section line 10—10 of Figure 8 illustrating further structural details of the modified form of the invention;

Figure 11 is a detailed sectional view illustrating the adjustable anchor connection for one end of the strap.

Figure 13 is a longitudinal section of Figure 12.

Figure 3:
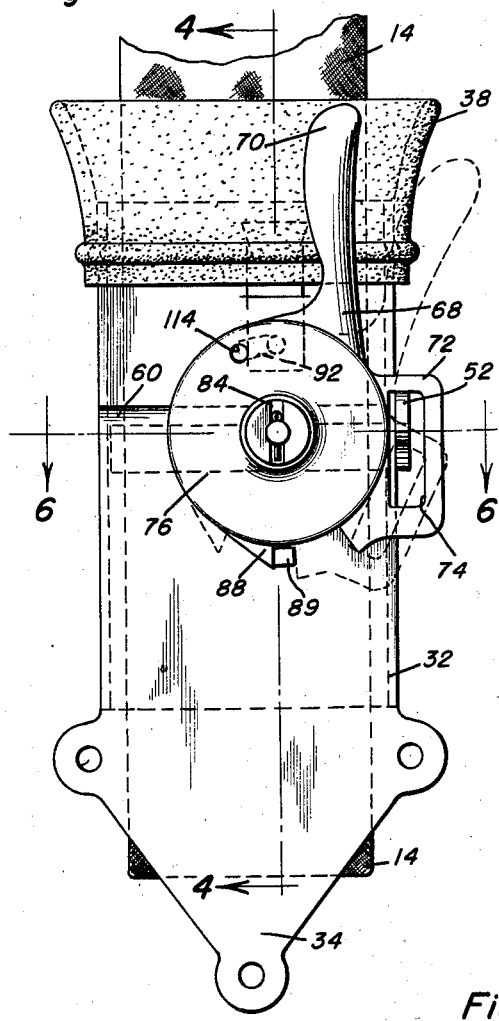
Figure 3 is a side elevational view of the construction of Figure 2.

Referring now specifically to the drawings where for the purposes of illustration, the seat belt construction of the present invention is generally designated by the numeral 10 and is shown associated with the seat 12 of the type generally found in automobiles, buses or other similar conveyances. The seat belt construction 10 generally includes an elongated flexible belt 14 of any suitable size and construction which may be conveniently constructed of webbing material having one end thereof anchored to a U-bolt 16 by virtue of an adjustment buckle 18 as illustrated in Figure 11 wherein the effective length of the belt 14 may be adjusted for taking into consideration the various size of person that may be employing the device. It is pointed out that the U-bolt 16 or any other suitable anchor means extends through a rigid frame member 20 thereby forming an adequate support for the belt 14. The other end of the belt 14 is free and provided with a rounded terminal end portion 22 for insertion into an anchor generally designated by the numeral 24 which is secured to the frame 20 as by U-bolt 26 and mounting strap 28 of twisted construction which has a sleeve portion 30 engaging the bight portion of the U-shaped bolt 26.

The anchor 24 generally includes a vertically elongated tubular member 32 of rectangular cross section with the inner wall thereof having an integral extending mounting plate 34 having a plurality of apertures 36 for receiving fastening members 37 for attaching the tubular member 32 to the mounting bracket 28.

An outwardly flared funnel-shaped member 38 is mounted at the open upper end of the tubular member 32 thus forming a guide for the insertion of the flexible belt 14. The funnel-shaped member 38 is constructed of resilient material such as rubber and is held in position on the tubular member 32 by a peripheral projection 40 adjacent the upper end of the tubular member 32.

The wall of the tubular member 32 opposite from the mounting bracket 34 is provided with an enlarged opening 42 having a pair of pivot ears 44 forming extensions of the end wall of the tubular member 32 and pivotally mounting an elongated cam lock 46 therebetween. The cam lock 46 is provided with a pair of cylindrical projections 48 at opposite ends thereof with one of the cylindrical projections 48 having an extension 50 of polygonal cross section for receiving the tapered actuating arm 52 which extends alongside one end wall of the tubular member 32 and has a free end portion 54 projecting beyond the other side wall of the tubular member 32. The cam lock member 46 is provided with a curved undersurface 56 and a plurality of serrations 58 which approximate the shape of saw teeth and the serrations 58 point towards the rounded pointed end of the cam lock member 46 remote from the pivot axis formed by the projections 48. The wall of the tubular member 32 having the extending bracket 34 thereon is provided with an offset portion 60 which coacts with the cam lock 46 for locking the belt 14 in the tubular member 32 and preventing withdrawal thereof until the actuating arm 52 is depressed thus pivoting the free end of the cam lock member 46 downwardly into disengaged relation as illustrated in the dotted line position in Figure 4.

An axial coil spring 62 is provided in circling relation to one of the trunnions 48 and has one end 64 secured to the cam lock member 46 and the other end thereof anchored to the tubular casing 32 thus urging the pivotal or oscillatable cam lock member 46 upwardly so that the belt 14 may be inserted into the tubular member by overcoming the resistance of the spring 62 after which the spring 62 will prevent withdrawal of the belt 14 until such time as the lock member 46 is pivoted downwardly.

An outwardly extending mounting bolt 66 is provided on the tubular member 32 and projects from the surface of the tubular member having the attaching bracket 34 thereon. The bolt 66 acts as a pivot axis for a manual trip lever 68 having a finger grip portion 70 and a projecting portion 72 having an enlarged rectangular opening 74 receiving the free end 54 of the actuating arm 52. The trip lever 68 includes a central cylindrical hollow portion 76 and an axial coil spring 78 encircles the bolt 66 with one end anchored to a closure plate 80 of the central hollow housing 76 and the other end thereof anchored to the bolt 66 for urging the trip lever 68 about its pivot axis in one direction of movement. The housing 76 is provided with a bearing member 82 in the form of a securing nut having a transverse slot 84 therein wherein a suitable pin 86 may be employed for retaining the housing 76 and the trip lever 68 on the bolt 66.

The housing 76 is provided with a lateral projection 88 for engagement with a projecting stop lug 89 thus limiting the pivotal movement of the housing 76 in one direction of movement whereby the hand grip or finger grip portion 70 will normally be disposed in a vertical position as illustrated in Figure 3.

The spring 78 automatically returns the trip lever 68 to a vertical position wherein the projection 88 will engage the stop lug 89 and limit the movement of the trip lever 68. The spring 78 serves a dual purpose since it keeps the trip lever 68 in a desired inoperative position while at the same time permitting a limited degree of lateral sliding movement on the bolt 66 with the member 82 forming a bearing for the rotational as well as limited sliding movement. The housing 76 is clinched to the backing member 80 as designated by the numeral 90 thus providing an enclosed housing and the trip lever 68 is provided with an arcuate slot 92 therein for receiving a cylindrical body 94 which slidably receives a plunger 96 having a closed end 98. The cylindrical body 94 is provided with a base portion 100 with a compression coil spring 102 extending between the base portion 100 and the closed end 98 of the plunger 96 thereby continuously urging the plunger 98 outwardly into frictional engagement with an inclined cam surface 104 on the inner surface of the housing 76. The inner end of the cylindrical member 94 formed by the base 100 is riveted to a flat spring member 106 which is anchored to the tubular member 32 by a struck out lug 108. The cylindrical housing 94 also passes through an opening 110 in the tubular member 32 which is of a size to permit inward movement of the base 100 as the closed end 98 rides against the cam surface 104. Directly across the tubular member from the base 100 of the cylindrical member 94 is an inwardly offset portion 112 which engages the surfaces of the belt 14 remote from the base portion 100.

In operation, the trip lever 68 is depressed from a position illustrated in full line in Figure 3 to the position illustrated in dotted line, progressive pressure is exerted on the capsule type plunger and more specifically the closed end 98 of the plunger 96 due to its engagement with the cam surface 104. When the plunger head 98 reaches the end of this path 104, the head 98 will drop into the aperture 114 at the extremity of the cam surface 104. It is pointed out that the total pressure required to compress coil spring 102 is greater than the pressure required to flex spring 106 to which it is attached which will cause a resultant bending of the spring 106 for causing the base 100 to bear against the belt 14. The trip lever 68 is now being held in a released though uncocked position by reason of the plunger head 98 received in the opening 114. During the depression of the trip lever 68, the actuating arm 52 was also depressed thereby disengaging the cam lock 46 from the belt 14 to permit removal thereof. During removal of the belt 14, a slight frictional resistance will occur due to the pressure exerted on the opposite sides of the belt by the recess 112 and the base 100 of the cylindrical member 94. This pressure is rather slight and causes little frictional resistance against easy removal of the belt. The removal of the belt is the last phase in the completion of an automatic cycle in that the pressure of plunger 96 against the housing 76 is released because spring 106 can then bend inward after the belt has been removed. The lever or trip arm 68 then snaps back to its original position by reason of the spring 78 which is sufficient to overcome any holding action of the plunger 96 and the head thereof 98 being disposed in the aperture 114. The trip lever is now back in its set or cocked position as limited by the lug 89 and the cycle may be repeated by merely picking up the loose end of the belt with the thumb and index finger and sliding the same into the tubular member. This device insures a complete automatic cycle starting from a set or a cocked position of trip lever, the insertion of the belt, the automatic cam lock grip of the belt, the release of the cam lock grip by manual means, the delayed action of trip lever 68, removal of the belt and automatic reset of the trip lever 68.

Referring now specifically to Figures 8–10 of the official drawings, it will be seen that a modified form of the anchor means is generally designated by the numeral 120. The basic elements of the invention are somewhat similar and are referred to by the same reference numerals as employed in conjunction with the description of Figures 1–7 with such reference numerals being primed.

The tubular member 32' is provided with the funnel-shaped member of resilient material 38' and adjacent the lower end thereof, a pair of projecting lugs 122 may be provided for receiving a pin 124 for attachment to a flexible member 126 such as a strap or belt which may be employed for anchoring the modified form of anchor 120.

Adjacent the offset portion 60' of the tubular member 32' is a pair of pivot ears 128 having a pin 130 extending therethrough for pivotally mounting a U-shaped member generally designated by the numeral 132 which includes a pair of leg portions 134 connected to pin 130 and the bight portion 136 disposed to the opposite side of the tubular member 32'. The free ends of the legs 134 which extend upwardly are provided with a pair of forwardly extending cam portions 136' which engage the upper surface of an actuating arm 138 attached to the polygonal portion 50' of the trunnions for the lock member 46'.

The bight portion 136 is in the form of a pressure plate having a recess 139 stamped centrally therein which forms a concave portion in the form of a natural pressure surface. The depressed or recessed area 139 forms a seat for a conical spiral spring 140 preferably of flat watch type main spring construction which has a normal conical shape. The spring 140 has its innermost and smallest coil centered on a projection 142 of a spring 144 of flat construction. The spring 144 is a safety catch spring which has at one extremity the projection 142 as just described and also a projection 146 forming a support therefor from the tubular member 32'. The spring 144 is also provided with a nib 148 which forms a pivot or fulcrum point and positioning point with the nib or rib nested in a similar depression 150 in the tubular member 32'. Spring 144 is held in permanent alignment through the facility of lugs 152 which turn inwardly over the spring 144.

The spring 144 is bent at right angles and provides an offset V-shaped portion 154 which acts as a catch and terminates in a suitable curve to form a thumb pedal 156 for actuation as a safety release.

The pressure plate 136 must be held depressed while belt 14' is completely withdrawn from the device. After the belt is withdrawn, pressure on plate 136 may be released and the coil spring will return plate 136 to its original position with a stop limit lug 158 which engages the tubular member 32'. The plate 136 has now overridden offset catch 154 and the spring 142 is now safety latched against the accidental pressure on plate 136. To effect a repetition of the cycle it is only necessary to slip belt 14' into the member 32' and the cam grip connection is automatically made.

Figure 6 of the drawings illustrates in dotted line a rubber or resilient shroud 160 which encloses the cam lock mechanism thus preventing accidental injury to the occupants of a vehicle and also eliminates any possible snagging of clothes such as might occur if the sharp edges of the mechanism were exposed.

Figure 4:
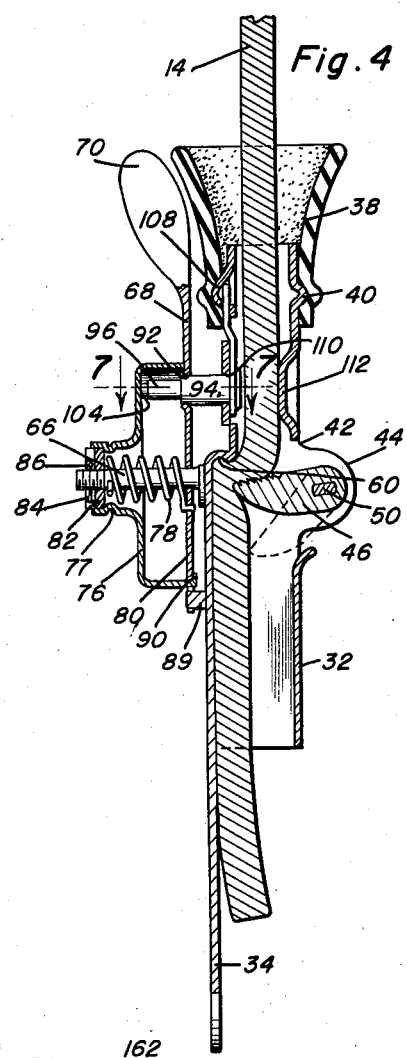
Figure 4 is a longitudinal, vertical sectional view taken substantially upon a plane passing along section line 4—4 of Figure 3 illustrating the internal structural details of the device.

Figures 4 and 6 illustrate a peripheral indentation 77 extending around the casing 76 for limiting the compression of spring 78 by nut 82.

The arcuate slot 92 in which the plunger housing 94 rides, forms an arcuate limit for the pivotal movement of the pressure lever 68.

Figure 12:
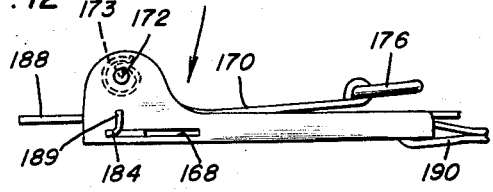
Figure 12 is an elevation of an emergency release device.
Figure 5:
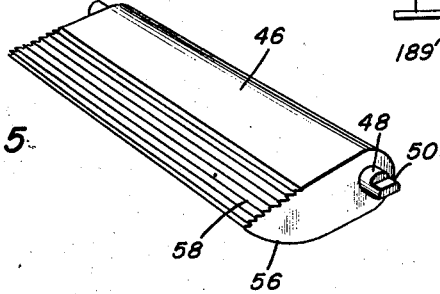
Figure 5 is a perspective view illustrating the construction of the pivotal cam lock.

Figures 12 and 13 illustrate an emergency release component of the safety belt system of the present invention and completes the system by providing a system which first restrains persons from hurdling forward at the time of an impact and also provides instantaneous release of such persons when trapped by the use of their own safety belts. The various types of conventional safety belts having conventional safety buckles associated therewith prevent instantaneous release due to extreme pressure or pull against the locking members which exceeds the normal strength of a person's fingers to break the lock. Also, some types of buckles automatically and instantly re-grip the belt even when the buckle has been released. In other instances, it may be extremely difficult to grasp the unlatching member of the conventional belt buckle because it may be embedded in loose clothing or expressed extremely tight against a portion of the body of the person being held by the belt.

In the present emergency release, the buckle is so designed that its release member can be easily seen or felt and instantly grasped. Once the emergency release member is pulled, all frictional contact with the belt and gripping members become separated and remain separated until such time that it is the intent to make a re-newed connection. A large finger ring is provided which needs no special intelligence or dexterity to pull outwardly for releasing the buckle and the release can be placed at any point on the belt and need not be placed for the convenience of the occupant but for the facility of rescues in case of accident. The release also serves the additional function of an adjusting means to compensate for the varying girth of different occupants.

The emergency release mechanism is generally designated by the numeral 162 and includes a main channel-shaped member 164 having a relatively wide lateral slot 166 adjacent one end thereof and longitudinally positioned slots 168 on the flanges adjacent the other end of the channel member. A latching member 170 is pivoted between the flanges of the channel-shaped member 164 by a transverse pivot pin 172. This end of the latching member 170 is provided with a serrated cam surface 174. The other end of the latching lever 170 is provided with a swingable loop ring 176 to facilitate the outward pivotal movement of the latching lever 170 about pivot pin 172 which is encircled by spring 173 for urging the same to unlatched position. The cam surface 174 also is convex and has a relatively short serrated surface.

A sliding plate 178 having a relatively narrow lateral slot 180 at one end thereof and a smooth and generally flat clamp grip surface 182 at the other end thereof is slidably disposed in the channel-shaped member 164. The sliding plate 178 is provided with a pair of integral lugs 184 extending outwardly through the slots 168 with the terminal ends of the lugs 184 being bent upward as designated by the numeral 189, thereby securing the sliding plate 178 in the channel shaped member 164 whereby the lugs 184 guide the longitudinal sliding movement of the sliding plate 178.

In order to make a belt connection, it is necessary to slide the lugs 184 forwardly by grasping the upwardly bent portions 189 and moving the cam surface 182 to the position directly under the cam surface 174 of the lock lever 170. The latch lever may then be depressed thereby gripping and locking the belt 188 in position. It should be noted that when a buckle connection has been made the belt end 190 is pulling against slot 180 of sliding plate 178 and not against slot 166 in channel member 164. In releasing the cam lock grip on the free end of the belt 188, the cam surface of sliding plate 178 will pull away from the cam surface of latch lever 170 by reason of the belt end 190 pulling on the sliding plate by reason of the wideness or relatively large slot 166 in channel member 164. Therefore, the belt cannot accidentally be re-gripped except by the intent of the occupant to again effect a buckle connection wherein it will be necessary to hold the lugs 189 in a direction towards the free end of the belt 188 or in remote relation to the slot 166. In order to preclude the possibility that the sliding plate 178 will accidentally slide forward, it is normally held in inoperative position by being restrained by a ribbon of woven elastic material 192 which is sewn within the folded end 190 of the belt. This buckle is an instant release device and a necessary component of a safety system and requires a certain degree of dexterity for making the connection which is desirable.

The release mechanism illustrated in Figures 12 and 13 would eliminate the necessity for the adjustable buckle arrangement illustrated in Figure 11, although in certain installations it may be feasible to employ both the construction of Figure 11 and Figures 12 and 13 or either of the constructions as may be desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A safety belt construction comprising an elongated flexible belt, and anchor means for detachable engagement with one end of said belt, said anchor means including an elongated tubular member for receiving said belt, cam lock means carried by the tubular member and preventing withdrawal of the belt after insertion thereof, and means for releasing said cam lock means thereby releasing said belt, said release means being manually actuated, said cam lock means including a pivotal cam member having serrations thereon for engagement with said belt, said tubular member having an offset portion for coacting with the cam member for locking the belt, said means for releasing said cam lock means including an actuating arm secured to said cam member, a pivotal trip lever engageable with said arm for operation thereof and spring means urging said trip lever to a normal reset position, and means connecting with the trip lever for delaying the return thereof to a normal position until such time as the belt is withdrawn from the tubular member.

2. A safety belt construction comprising an elongated flexible belt, and anchor means for detachable engagement with one end of said belt, said anchor means including an elongated tubular member for receiving said belt, cam lock means carried by the tubular member and preventing withdrawal of the belt after insertion thereof, and means for releasing said cam lock means thereby releasing said belt, said release means being manually actuated, said cam lock means including a pivotal cam member having serrations thereon for engagement with said belt, said tubular member having an offset portion for coacting with the cam member for locking the belt, said means for releasing said cam lock means including an actuating arm secured to said cam member, a pivotal trip lever engageable with said arm for operation thereof and spring means urging said trip lever to a normal reset position, and means connecting with the trip lever for delaying the return thereof to a normal position until such time as the belt is withdrawn from the tubular member, said delaying means including a spring urged plunger having a movable base portion frictionally slidably engaging said belt, cam means on said trip lever for urging said plunger into engagement with the belt, and socket means removably receiving said plunger and holding the trip lever in tripped position until the belt is removed thereby permitting inward movement of the plunger and release of the lever.

3. In a safety belt construction, an anchor device comprising a tubular member, said tubular member receiving an end of a seat belt, the wall of said tubular member having an offset portion defining a transverse abutment in generally perpendicular relation to the longitudinal axis of the tubular member, a cam member swingably mounted on the tubular member for movement about an axis in horizontally and vertically spaced parallel relation to the transverse abutment, said cam member having a flat surface opposed to the abutment thereby gripping the belt therebetween when the flat surface of the cam member approaches the abutment with the belt therebetween with the major portion of the frictional gripping force on the belt occurring between the abutment and the flat surface of the cam member thereby enabling the cam member to be swung arcuately away from the abutment without the necessity of overcoming the gripping force or overcoming the longitudinal force on the belt, and manually operated means supported on the tubular member and engageable with the cam member for swinging the cam member away from the abutment and releasing the belt, said flat surface of the cam member is provided with a plurality of serrations extending completely across the flat surface of the cam member in parallel relation to the abutment, said serrations defining saw teeth inclined towards the outer end of said cam member for engagement with the belt and precluding longitudinal movement of the belt when gripped between the abutment and the cam member.

4. The combination of claim 3, wherein said flat surface of the cam member has a transverse length greater than the width of the tubular member with the pivot axis for the cam member being remote from the area of gripping engagement between the cam member and the belt whereby pivotal movement of the cam member will cause rapid movement of the cam member away from the belt due to the high linear speed of the outer end of the cam member.

5. The combination of claim 4, wherein said tubular member is provided with a funnel-shaped extension of semi-rigid and self-sustaining cushioning material forming a guide for insertion of the belt and protecting the hand of the person from injury when inserting the belt.

6. The combination of claim 5, wherein said abutment and cam member are disposed adjacent the longitudinal center of the tubular member whereby the gripping end of the cam member will be concealed and spaced from the ends of the tubular member thereby preventing accidental entanglement of clothes or other foreign material with the cam member.

7. In a safety belt construction, an anchor device comprising a tubular member, said tubular member receiving an end of a seat belt, the wall of said tubular member having an offset portion defining a transverse abutment in generally perpendicular relation to the longitudinal axis of the tubular member, a cam member swingably mounted on the tubular member for movement about an axis in horizontally and vertically spaced parallel relation for gripping engagement with the belt, said cam member including end extensions journaled on the tubular member, at least one of said extensions extending through the wall of the tubular member, an actuating arm rigid with said one extension and extending laterally therefrom for swinging movement alongside the tubular member about the same axis as the cam member, a spring-returned trip lever pivotally mounted on said tubular member and having a portion engageable with said arm for swinging the arm in response to pivotal movement of the lever.

8. The combination of claim 7, wherein said tubular member is provided with an opening, resilient latch means movably supported on said tubular member and extending through said opening into contact with the belt, said latch means retaining the trip lever in position for releasing the cam member while the latch means is in contact with the belt, removal of the belt from the tubular member effecting movement of the latch means thereby releasing the lever for return to a normal position.

9. The combination of claim 8, wherein said latch means includes a belt contact member extending through the opening, said contact member including an outwardly extending resilient keeper means, said lever including means for engaging the keeper means when the lever is moved to a cam member released position and retaining the lever in this position until the belt is removed from the tubular member, said contact member moving inwardly in response to absence of the belt thereby disengaging the means on the lever from the keeper means for return of the lever to a normal position.

10. The combination of claim 7, wherein said trip lever is provided with a hand pressure plate overlying a wall of the tubular member, a spiral coil spring disposed between the pressure plate and the tubular member urging the lever to normal position, said spring being collapsible to a length equal to the thickness of one convolution thereof for reducing the spacing between the pressure plate and tubular member.

References Cited in the file of this patent

UNITED STATES PATENTS

| | | |
|---|---|---|
| 528,455 | Zeller | Oct. 30, 1894 |
| 718,835 | Granger | Jan. 20, 1903 |
| 920,899 | Allen | May 11, 1909 |
| 2,066,914 | Staples | Jan. 5, 1937 |
| 2,458,810 | Varney et al. | Jan. 11, 1949 |
| 2,517,424 | Griswold | Aug. 1, 1950 |
| 2,665,143 | Rasmussen | Jan. 5, 1954 |
| 2,804,313 | Giles | Aug. 27, 1957 |
| 2,814,336 | Manhart et al. | Nov. 26, 1957 |
| 2,833,555 | Zotkewicz | May 6, 1958 |

FOREIGN PATENTS

| | | |
|---|---|---|
| 200,076 | Australia | Nov. 4, 1955 |